United States Patent
Chamaken Kamde et al.

(10) Patent No.: US 9,964,129 B2
(45) Date of Patent: May 8, 2018

(54) METHOD FOR DETERMINING A CONTROL FORCE OF AN ACTUATOR

(71) Applicant: ZF Friedrichshafen AG, Friedrichshafen (DE)

(72) Inventors: Alain Tierry Chamaken Kamde, Langenargen (DE); Wilhelm Moser, Markdorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 290 days.

(21) Appl. No.: 14/863,632

(22) Filed: Sep. 24, 2015

(65) Prior Publication Data
US 2016/0091001 A1  Mar. 31, 2016

(30) Foreign Application Priority Data
Sep. 26, 2014 (DE) .................. 10 2014 219 536

(51) Int. Cl.
*F15B 19/00* (2006.01)
*G05B 1/00* (2006.01)
*F15B 11/042* (2006.01)

(52) U.S. Cl.
CPC ............. *F15B 19/007* (2013.01); *G05B 1/00* (2013.01); *F15B 11/0426* (2013.01); *F15B 2211/30575* (2013.01); *F15B 2211/3138* (2013.01); *F15B 2211/6336* (2013.01)

(58) Field of Classification Search
CPC ................. F15B 19/007; F15B 11/028; F15B 2211/6323; F16D 13/75; F16D 25/126; F16D 25/14
See application file for complete search history.

(56) References Cited

U.S. PATENT DOCUMENTS

| | | | | |
|---|---|---|---|---|
| 3,750,789 | A * | 8/1973 | Buchelt | F16D 43/284 |
| | | | | 192/105 A |
| 4,216,851 | A * | 8/1980 | Chatterjea | F16D 25/14 |
| | | | | 192/220.1 |
| 2013/0231836 | A1* | 9/2013 | Moseler | F16D 25/14 |
| | | | | 701/68 |
| 2015/0283747 | A1* | 10/2015 | Hofmann | B29C 47/0014 |
| | | | | 425/319 |

FOREIGN PATENT DOCUMENTS

DE   10 2007 022 126 A1   11/2008

* cited by examiner

*Primary Examiner* — Stacey Fluhart
(74) *Attorney, Agent, or Firm* — Davis & Bujold PLLC; Michael J. Bujold

(57) ABSTRACT

A method for determining an operating force ($F_p$) of a positioning actuator (3), whose adjustment movements are produced by virtue of an appropriate supply of a working medium via actuating at least one valve (4 to 7) associated with the positioning actuator (3). The operating force ($F_p$) is determined by computational determination. To be able to carry out the computational determination of the operating force ($F_p$) with little effort, by the at least one valve (4 to 7) in each case, a respective, essentially constant mass flow ($\dot{m}_{iv}$, $\dot{m}_{ov}$) of working medium is maintained either into the positioning actuator (3) and/or out of the positioning actuator (3).

17 Claims, 1 Drawing Sheet

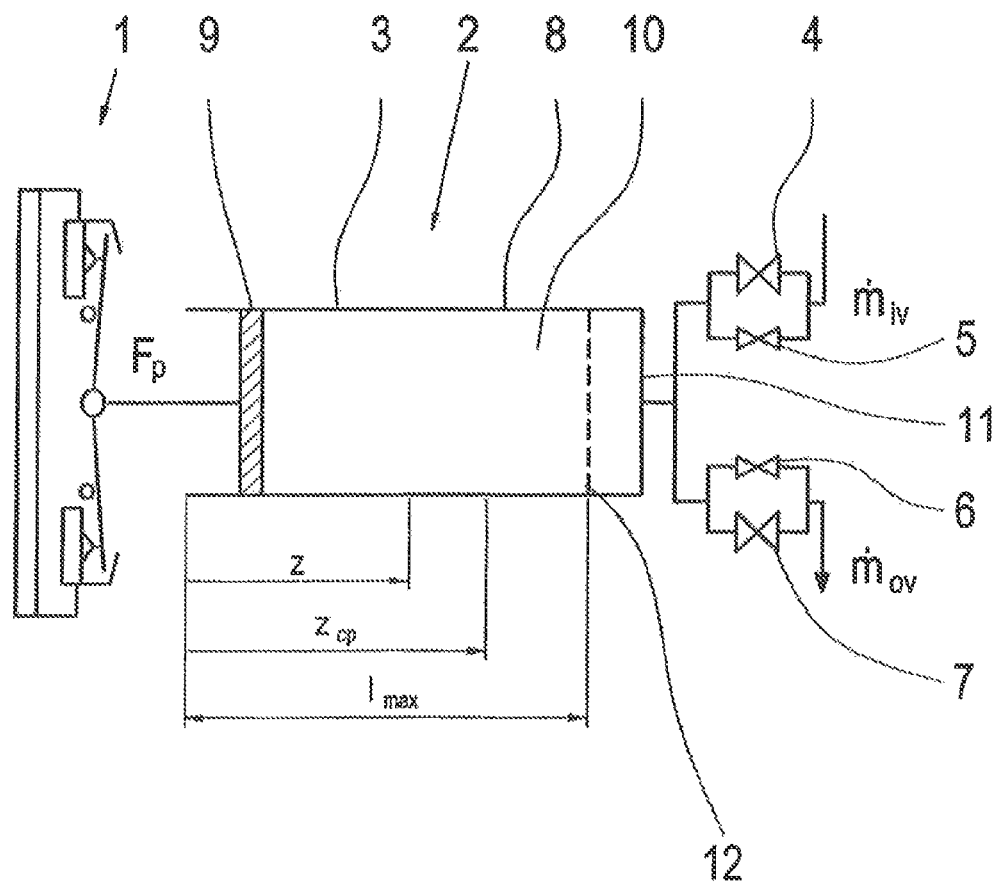

METHOD FOR DETERMINING A CONTROL FORCE OF AN ACTUATOR

This application claims priority from German patent application serial no. 10 2014 219 536.5 filed Sep. 26, 2014.

FIELD OF THE INVENTION

The invention concerns a method for determining the operating force of a positioning actuator, whose adjustment movements are produced by the supply as necessary of a working medium by actuating at least one valve associated with the positioning actuator, in which method the operating force is determined by computational means. In addition, the invention concerns an actuating mechanism with a positioning actuator and a computer program product, as well as a data carrier containing the latter.

BACKGROUND OF THE INVENTION

Positioning actuators are used inter alia in motor vehicles in the area of automatically actuated separator clutches and, within the drive-train concerned, bring about the opening or closing of the separator clutch. For this, positioning actuators are usually in the form of actuating pistons which, to produce the required adjustment movements, are supplied as necessary with a working medium, the working medium often being compressed air in the commercial vehicle sector. The inflow of the working medium is usually controlled by one or even more than one valve. In particular, however, in the case of a separator clutch in the form of a friction clutch, from the standpoint of operating time a contact point can be displaced as a result of wear and this entails adapting operating parameters of the positioning actuator for control purposes in order to ensure, as before, that during driving operation the separator clutch is opened and closed in a reliable and comfort-orientated manner. Accordingly sensors are often provided in the area of the positioning actuator concerned, by way of which an operating force of the actuator can be deduced in each case and by taking into account at the same time a current clutch position, a wear-related displacement of a characteristic curve of the separator clutch can be recognized. Sometimes, however, an operating force of a positioning actuator is also determined by computation, in order to be able to determine it even without the use of sensors and therefore in a more cost-effective manner.

In DE 10 2007 022 126 A1 a method for determining a characteristic parameter of a positioning actuator is described, which actuator is in the form of a piston-cylinder unit. The characteristic parameter to be determined is, among others, an operating force of the positioning actuator, and for that purpose a computation module is used and a determination is carried out with the help of a simulation.

SUMMARY OF THE INVENTION

Starting from the prior art described above, the purpose of the present invention is now to provide a method for determining an operating force of a positioning actuator, in which method the operating force can be determined by computation with little cost and effort.

This objective is achieved in combination with the characterizing features and advantageous further developments of the invention as described below. An actuating mechanism with a positioning actuator, whose operating force is determined in accordance with the method according to the invention, is also described below. Finally, a computer program product that implements the method according to the invention and a data carrier on which such a computer program product is stored and can be called up, are also objects of the following discussion.

According to the invention the method is used for determining an operating force of a positioning actuator whose adjustment movements are produced by supplying the actuator as necessary with a working medium, by actuating at least one valve associated with the positioning actuator. In this case the operating force is determined by computation. The positioning actuator is part of an actuating mechanism, particularly preferably an actuating mechanism of a separator clutch in a vehicle drive-train. Furthermore, the positioning actuator is in particular designed as a linear-action actuator and thus in the form of a piston-cylinder unit, which when supplied with the working medium, carries out linear adjustment movements. In particular, when the working medium is supplied this brings about a first adjustment movement in the form of an extension of the piston, whereas when the working medium is discharged the piston is pressed back in so that a second adjustment movement in the direction opposite to the first adjustment movement can take place. The working medium is in particular compressed air and in that case the piston-cylinder unit is a pneumatic positioning actuator, although as an alternative a hydraulic system can be made.

Moreover, in particular a plurality of valves are associated with the position actuator, at least one of these controlling the inflow of working medium to the actuator whereas at least one valve enables he medium to be discharged. Particularly preferably however, both for the supply and for the discharge of medium in each case two valves are provided, these in particular differing in their flow cross-sections so that a higher mass flow can in each case pass through one respective valve than through the other.

The invention embodies the technical principle that by way of the at least one valve, in each case an essentially more constant mass flow of working medium into and/or out of the positioning actuator can be produced. In other words, the at least one valve associated with the positioning actuator is operated in such manner that an essentially constant mass flow is produced into or out of the positioning actuator.

Such an embodiment of a method for determining an operating force of a positioning actuator has the advantage that, due to the constant mass inflow and/or discharge, in each case, a condition is created in which any influence of non-linear factors in the system is reduced as much as possible. This in turn has the consequence that a particular operating force can be determined to a good approximation by means of a simplified calculation without having to make use of a complicated simulation model. With a constant mass flow supply a simplified calculation of an operating force during an adjustment movement in a first direction can be used, while the setting of a constant discharge mass flow enables the use of the simplified determination of the operating force during an adjustment movement in a second direction opposite to the first direction.

In contrast to this, DE 10 2007 022 126 A1 does not propose to set a constant mass flow. As a result, in the simulation model used for determining the operating force, the influence of non-linear factors must also be taken into account as necessary, which renders the computation model correspondingly complicated. Consequently, in some circumstances a calculation during operation can only be carried out with difficulty.

In the context of the invention, the expression "essentially" means that deviations only occur in a form of changes that are insignificant for operation. This is understood to mean, in particular, fluctuations occurring in the mass flow are extremely slight and/or only absolutely sporadic.

According to an embodiment of the invention, a vehicle clutch is actuated by the positioning actuator and, correspondingly, by virtue of the operating force of the positioning actuator a release force of the vehicle clutch is represented. In this case, therefore, the positioning actuator is part of an actuating mechanism of a vehicle clutch and when supplied with working medium, causes the clutch to open. By determining the actuating force, the release force relevant for the control of the vehicle clutch can be deduced without having to provide a corresponding sensor for this. As an end effect this also makes it possible to reach a conclusion regarding the wear condition of the vehicle clutch.

In a further development of the aforesaid embodiment, with reference to a variation of the operating force and taking account of respective clutch positions of the motor vehicle clutch, a characteristic curve of the disengagement force is developed by means of a polynomial. Thereafter that characteristic can be determined with little complexity. Particularly preferably, the characteristic developed can then be stored in an EEPROM of a control unit, in particular a transmission control unit of the motor vehicle, and is then available for future use. In addition a routine for determining the polynomial coefficients is either initiated by a diagnostic demand or, with the vehicle at rest and in gear, by locating a contact point of the vehicle clutch.

Also preferably, after the characteristic has been developed a gain-scheduling method is used to determine parameters for regulating the motor vehicle clutch, whereby for the regulation of the motor vehicle clutch, relevant parameters can be adapted directly to the release force characteristic, so enabling a corresponding adaptation to the wear condition of the clutch and to an associated displacement of the contact point.

According to a further possible embodiment of the invention, the incoming mass flow is kept essentially constant by means of at least one valve, and alternatively or additionally to this, the outgoing mass flow is also kept essentially constant by means of at least one valve. However, in particular both the incoming and the outgoing mass flow are kept constant by means of the corresponding valve or valves, in order to be able to determine operating forces of the positioning actuator with reference to simplified computation models.

In accordance with a further advantageous embodiment possibility of the invention, the incoming and/or outgoing mass flows of working medium is/are in each case kept essentially constant by actuating the at least one valve with a low frequency, the frequency being preferably in the range of 5 to 20 Hz and particularly preferably 10 Hz. Tests have shown that the choice of an actuation frequency of one or more valves in the range results in the maintenance of a constant mass flow.

The method according to the invention is implemented in the area of an actuating mechanism of a vehicle clutch, the actuating mechanism in particular being associated in the context of regulation technology in particular with a transmission control unit of the motor vehicle concerned. The system according to the invention can also be embodied as a computer program product which, when run on a processor, for example a processor of the transmission control unit, instructs the processor by software means to carry out the associated process steps which are the object of the invention. In this connection the object of the invention also includes a computer-readable medium in which a computer program product as just described is stored and can be recalled.

The invention is not limited to the combination indicated in the principal claim or the claims that depend on it. It is also possible to combine other individual features with one another in different ways, provided that they emerge from the claims, from the description of a preferred embodiment of the invention given below, or directly from the drawing. The references in the claims to the drawing by means of indexes, is not intended to restrict the protective scope of the claims.

BRIEF DESCRIPTION OF THE DRAWING

An advantageous design of the invention, which will be described below, is represented in the drawing. The sole FIGURE shows a schematic illustration of a clutch mechanism of a motor vehicle.

DETAILED DESCRIPTION OF THE PREFERRED EMBODIMENTS

The motor vehicle comprises a vehicle clutch 1 in the form of a separator clutch and an operating mechanism 2 associated with the motor vehicle clutch 1. In this case the motor vehicle clutch 1 is of a type whose principle is well known to anyone with knowledge of the field, and need not therefore be described further here.

As can be seen from the single FIGURE, the operating mechanism 2 comprises essentially a positioning actuator 3 and valves 4 to 7. Furthermore, in this case the positioning actuator 3 is in the form of a piston-cylinder unit wherein a piston 9 can move axially inside a hollow cylinder 8. When an inside space 10 of the positioning actuator 3 is filled with a working medium in the form of compressed air, the piston 9 undergoes an adjustment movement in the direction toward the motor vehicle clutch 1 and thereby opens the clutch in opposition to spring elements (not shown in more detail here). A movement of the piston 9 within the hollow cylinder 8 is limited toward the bottom 11 of the hollow cylinder 8 by a mechanical stop 12, which thus also defines a maximum travel path $I_{max}$ of the positioning actuator 3, The supply of compressed air to the inside space 10 is, in this case, controlled by the valves 4 and 5, which are, in each case, designed as directional valves with discrete switching positions, but which have through-flow cross-sections different from one another. When compressed air is passed into the inside space 10 by way of the valves 4 and 5, the motor vehicle clutch 1 is acted upon by an actuating force $F_p$ determined by the input mass flow $\dot{m}_{iv}$ supplied. If the motor vehicle clutch 1 is then to be closed, the compressed air is allowed to escape from the inside space 10 by way of the valves 6 and 7, which are also designed as directional valves with discrete switching positions but through-flow cross-sections different from one another. A defined mass flow $\dot{m}_{ov}$ determined by the valves 6 and 7 defines the characteristic for the closing of the motor vehicle clutch 1.

Depending on the position of the piston 9 in the hollow cylinder 8, different clutch positions z are also defined, such that one position of the piston 9 corresponds to a contact point $z_{cp}$ beyond which, during the course of its closure, the motor vehicle clutch 1 can for the first time transmit torque, i.e. the two halves of the clutch come in contact with one another for the first time, In order, now, to be able to determine the release force $F_p$ of the motor vehicle clutch 1 by computation in a simple manner during operation, according to the invention an actuation frequency of the valves 4 to 7 is chosen in a range from 5 to 20 Hz, preferably 10 Hz, whereupon the two mass flows $\dot{m}_{iv}$ and $\dot{m}_{ov}$ are essentially constant. Consequently, the release force $F_p$ for opening can be calculated in accordance with the formula:

$$F_p(t) = \frac{(m_0 + \dot{m} \cdot t) \cdot R \cdot T}{\frac{V_0}{A} + l_{max} - z(t)}$$

and for closing by the formula:

$$F_p(t) = \frac{(m_{max} + \dot{m} \cdot T_s \cdot (p_z/p_s)) \cdot R \cdot T}{\frac{V_0}{A} + l_{max} - z(t)}$$

in which $m_0$ is the air mass of the dead volume of the positioning actuator, $\dot{m}$ is the respective constant mass flow, R is the specific gas constant, 1 is the specific gas temperature, $V_0$ is the dead volume, A is the piston area of the piston 9, $p_z$ is the internal pressure of the cylinder, $p_s$ is the reservoir pressure of a reservoir that supplies the positioning actuator, and $m_{max}$ is the air mass in the positioning actuator when the piston is fully extended.

Thereafter, from the respective release forces $F_p(t)$ and the associated clutch positions $z_{(t)}$, by means of a suitable polynomial, a characteristic curve of the release force is determined and stored in an EEPROM of the clutch control unit or the transmission control unit. The routine for determining the polynomial coefficients is preferably initiated with the motor vehicle at rest and with a gear engaged by locating the contact point $z_{cp}$, although it can also be initiated in the context of a diagnosis demand.

Thereafter, with the help of a gain-scheduling method, adaptation of control parameters of the positioning actuator 3 to the characteristic determined is carried out, in order to be able to regulate the opening and closing of the motor vehicle clutch 1 under conditions that may have changed in the meantime.

By virtue of a method according to the invention for determining an operating force of a positioning actuator, the operating force can be determined by computational means with little cost and effort.

INDEXES

1 Motor vehicle cutch
2 Actuating mechanism
3 Positioning actuator
4 Valve
5 Valve
6 Valve
7 Valve
8 Hollow cylinder
9 Piston
10 inside space
11 Bottom
12 Stop
$I_{max}$ Maximum travel path
$\dot{m}_{iv}$ Incoming mass flow
$\dot{m}_{ov}$ Outgoing mass flow
$F_p$ Actuation force
z Clutch position
$z_{cp}$ Contact point

The invention claimed is:

1. A method of determining an operating force ($F_p$) of a positioning actuator (3), whose adjustment movement is produced by a supply of a working medium by actuation of first and second valves which communicates with the positioning actuator (3), the method comprising:
producing an essentially constant mass flow ($\dot{m}_{iv}$, $\dot{m}_{ov}$) of the working medium by the first and the second valves either:
into the positioning actuator (3), or
out of the positioning actuator (3) thus reducing an influence of non-linear factors; on the operating force
determining the operating force ($F_p$) using computation performed, via a control unit, during operation of a motor vehicle clutch;
creating a characteristic curve using a polynomial; and
comparing the operating force ($F_p$) to the characteristic curve, via the control unit, to determine a wear condition the motor vehicle clutch.

2. The method according to claim 1, further comprising actuating the motor vehicle clutch (1) using the positioning actuator (3) in such manner that the operating force ($F_p$) of the positioning actuator (3) represents a release force of the motor vehicle clutch (1).

3. The method according to claim 2, further comprising creating the characteristic curve of the release force by varying the operating force ($F_p(t)$) and taking into account respective clutch positions ($z(t)$) of the motor vehicle clutch (1).

4. The method according to claim 3, further comprising, after creation of the characteristic curve of the release force, determining, via the control unit, parameters for regulation of the motor vehicle clutch (1) by a gain-scheduling method.

5. The method according to claim 2, further comprising keeping an incoming mass flow ($\dot{m}_{iv}$) essentially constant via the first valve (4, 5).

6. The method according to claim 2, further comprising keeping an outgoing mass flow ($\dot{m}_{ov}$) essentially constant via the second valve (6, 7).

7. The method according to claim 1, further comprising controlling the first and the second valves with a low frequency, in a range 5 to 20 Hz, to set the essentially constant incoming mass flow ($\dot{m}_{iv}$) and the essentially constant outgoing mass flow ($\dot{m}_{ov}$).

8. An actuating mechanism (2) for a motor vehicle clutch (1) comprising a positioning actuator (3) whose adjustment movement is produced by a supply of compressed air by actuation of first and second valves that communicates with the positioning actuator (3), and an operating force (Fp) of the positioning actuator (3) being determined by a method comprising:
producing an essentially constant mass flow ($\dot{m}_{iv}$, $\dot{m}_{ov}$) of the compressed air by the first and second valves either:
into the positioning actuator (3), or
out of the positioning actuator (3) thus reducing an influence of non-linear factors; on the operating force
determining the operating force ($F_p$) using computation performed, via a control unit, during operation of the motor vehicle clutch;
creating a characteristic curve using a polynomial and comparing the operating force ($F_p$) to the characteristic curve, via the control unit, to determine a wear condition the motor vehicle clutch.

9. The actuating mechanism (2) according to claim 8, further comprising a computer program product for determining the actuating force (Fp) of the positioning actuator (3), the computer program product issuing corresponding commands, stored in a software module on the control unit, for setting the respective essentially constant mass flow ($\dot{m}_{iv}$, $\dot{m}_{ov}$) of the compressed air into the positioning actuator (3) and out of the positioning actuator (3), and determining the operating force (Fp) of the positioning actuator (3) using the following formula for disengaging the vehicle clutch:

$$F_p(t) = \frac{(m_0 + \dot{m} \cdot t) \cdot R \cdot T}{\frac{V_0}{A} + l_{max} - z(t)}$$

and $$F_p(t) = \frac{(m_{max} + \dot{m} + T_s \cdot (p_z / p_s)) \cdot R \cdot T}{\frac{V_0}{A} + l_{max} - z(t)}$$

for engaging vehicle clutch, where $m_o$ is an air mass of a dead volume of the positioning actuator, $\dot{m}$ is respective constant mass flow, R is a specific gas constant, T is a specific gas temperature, $V_o$ is the dead volume, A is a piston area of a piston of the positioning actuator, $p_z$ is an internal pressure of a cylinder, $p_s$ is a reservoir pressure of a reservoir that supplies the positioning actuator, and $m_{max}$ is an air mass in the positioning actuator when the piston is fully extended.

10. The actuating mechanism (2) according to claim 9, further comprising a data carrier upon which the computer program product is stored.

11. The actuating mechanism according to claim 8, further comprising actuating the motor vehicle clutch (1) using the positioning actuator (3) in such manner that the operating force ($F_p$) of the positioning actuator (3) represents a release force of the motor vehicle clutch (1).

12. The actuating mechanism according to claim 11, further comprising creating the characteristic curve of the release force by varying the operating force ($F_p(t)$) and taking into account respective clutch positions (z(t)) of the motor vehicle dutch (1).

13. The actuating mechanism according to claim 12, further comprising, after creation of the characteristic curve of the release force, determining, via the control unit, parameters for regulation of the motor vehicle clutch (1) by a gain-scheduling method.

14. The actuating mechanism according to claim 11, further comprising keeping an incoming mass flow ($\dot{m}_{iv}$) essentially constant via the first valve (4, 5).

15. The actuating mechanism according to claim 11, further comprising keeping an outgoing mass flow ($\dot{m}_{ov}$) essentially constant via the second valve (6, 7).

16. The actuating mechanism according to claim 8, further comprising controlling the first and second valves with a low frequency in a range 5 to 20 Hz to set the essentially constant mass flow ($\dot{m}_{iv}$, $\dot{m}_{ov}$).

17. A data carrier for storing a computer program product for an actuating mechanism (2) having a positioning actuator (3) for a motor vehicle clutch (1), the positioning actuator (3) being movable by a supply of a working medium by actuation of first and second valves that communicates with the positioning actuator (3), and an operating force (Fp) of the positioning actuator (3) being determined by a method comprising:
producing an essentially constant mass flow ($\dot{m}_{iv}$, $\dot{m}_{ov}$) of the working medium by the first and second valves either:
into the positioning actuator (3), or
out of the positioning actuator (3) thus reducing an influence of non-linear factors; on the operating force
determining the operating force ($F_p$) using computation performed on a control unit during operation of the motor vehicle clutch;
creating characteristic curve using a polynomial; and
comparing the operating force($F_p$) to the characteristic curve, via the control unit, to determine a wear condition the motor vehicle clutch,
the computer program carrying out corresponding commands, that are stored in a software module in the control unit, for setting in each case of the essentially constant mass flow ($\dot{m}_{iv}$, $\dot{m}_{ov}$) of the working medium at least one of into the positioning actuator (3) and out of the positioning actuator (3).

* * * * *